United States Patent

[11] 3,617,860

[72] Inventors Richard J. Williams
Carson;
Paul Pavljuk, Los Angeles, both of Calif.
[21] Appl. No. 53,424
[22] Filed July 9, 1970
[45] Patented Nov. 2, 1971
[73] Assignee International Rectifier Corporation
Los Angeles, Calif.

[54] THYRISTOR VOLTAGE CONTROL CIRCUIT WITH COMMUTATING CAPACITOR
7 Claims, 5 Drawing Figs.

[52] U.S. Cl. .................................................. 323/19,
307/252 N
[51] Int. Cl. ................................................... G05f 1/44
[50] Field of Search ........................................... 307/252 M,
252 N, 252 W; 321/18, 45 C; 323/16, 19, 22 SC,
34

[56] References Cited
UNITED STATES PATENTS
3,176,212 3/1965 DePuy ........................... 323/22 SC 3,361,931 1/1968 Vollrath ........................ 323/22 SC
3,440,445 4/1969 Kusa ............................. 307/252 W
OTHER REFERENCES
Commutation in AC Circuits, General Electric SCR Manual, 4th Edition, 1967, pgs. 183, 184

Primary Examiner—J. D. Miller
Assistant Examiner—A. D. Pellinen
Attorney—Ostrolenk, Faber, Gerb and Soffen ABSTRACT: An AC voltage control circuit contains a full-wave bridge rectifier in series with an AC voltage source and load, and a thyristor is connected across the DC terminals of the bridge. A commutating circuit including a capacitor in parallel with a series connected diode and discharge resistor is connected between the source terminal end of the load and a terminal of the thyristor and extends the available turnoff time of the thyristor.

PATENTED NOV 2 1971   3,617,860

INVENTORS
RICHARD J. WILLIAMS
PAUL PAVLJUK
BY
Ostrolenk, Faber, Gerb & Soffen
ATTORNEYS

THYRISTOR VOLTAGE CONTROL CIRCUIT WITH COMMUTATING CAPACITOR

BACKGROUND OF THE INVENTION

This invention relates to a voltage control circuit, and more particularly relates to a commutator circuit which prolongs the available turnoff time of a thyristor connected across the DC terminals of a full-wave AC bridge circuit in series with an AC source and a load.

PRIOR ART

The use of a single thyristor as the control element of an AC voltage control circuit is well known. In these circuits, the thyristor is connected across the terminals of an AC full-wave bridge circuit, and an AC source, in series with a load, is connected to the AC terminals of the bridge. Thus, current flows through the load in series with the thyristor when the thyristor is in conduction. This type circuit is best used in full cycle ratio control arrangements, such as proportional heating control arrangements or for static ON-OFF control as in motor starter applications.

This technique, while economical, places a stringent requirement on the turnoff capability of the thyristor. Thus, the available turnoff time, since the thyristor conducts each half cycle, is simply the time the source voltage is below the threshold voltages of the bridge diodes and the thyristor and while the load current is below the holding level of the thyristor. Thus, it was found that with an 8-ampere RMS load, driven from a 265 v. RMS, 60 Hz. line, the available turnoff time was below 20 microseconds. This turnoff time will be decreased with increased values of load current.

BRIEF DESCRIPTION OF INVENTION

In accordance with the invention, a commutating capacitor is connected between the thyristor cathode and a source terminal such that the capacitor will cause prolongation of the available turnoff time for the thyristor. Thus, when a firing signal is removed from the thyristor gate, the thyristor will turn off at the end of the first half cycle which is effected by the commutating capacitor. The commutating capacitor is provided with a parallel circuit including a diode and discharge resistor to discharge the capacitor before the peak of the next half-wave voltage when the source voltage and capacitor voltage are applied in series with the thyristor. The use of such a commutating capacitor can be shown to increase the available turnoff time of the thyristor, for example to 50 microseconds.

Figure 1:
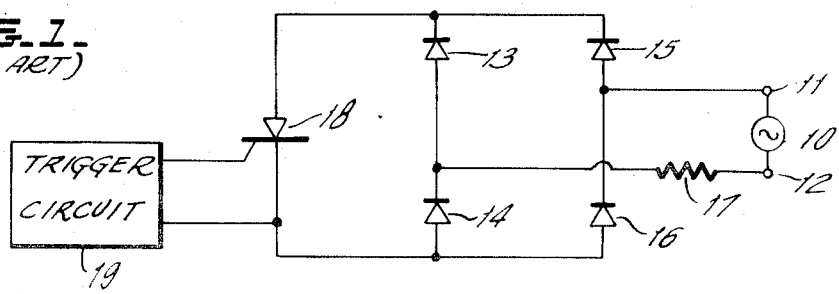
FIG. 1 shows a prior art voltage control circuit.

Referring first to FIG. 1, there is shown a typical prior art circuit which includes an AC source 10, which could be a 60-cycle source having terminals 11 and 12. Source terminals 11 and 12 are connected to the AC terminals of the full-wave single-phase bridge formed of diodes 13, 14, 15 and 16. The load 17 is connected between the AC bridge terminal and AC terminal 12. Thyristor 18 is then connected as shown to the DC terminals of the bridge. A suitable trigger or firing circuit 19 is connected between the gate and cathode electrodes of thyristor 18 to control its firing.

In operation, the circuit of FIG. 1 permits energization of load 17 when the trigger circuit 19 permits thyristor 18 to conduct. In order to deenergize load 17, the firing signal from trigger circuit 19 is removed from thyristor 18 so that the thyristor will turn off, and will not conduct on the next half cycle.

The available turnoff time for the thyristor 18 in this type circuit, however, is very short and may be less than 20 microseconds. This is the time during which the source voltage is below the threshold voltage of, for example, diode 15, thyristor 18 and diode 14 and the current is less than the holding current of the thyristor. Note that if the thyristor cannot turn off in the short available turnoff time, the circuit cannot be turned off.

Figure 2:
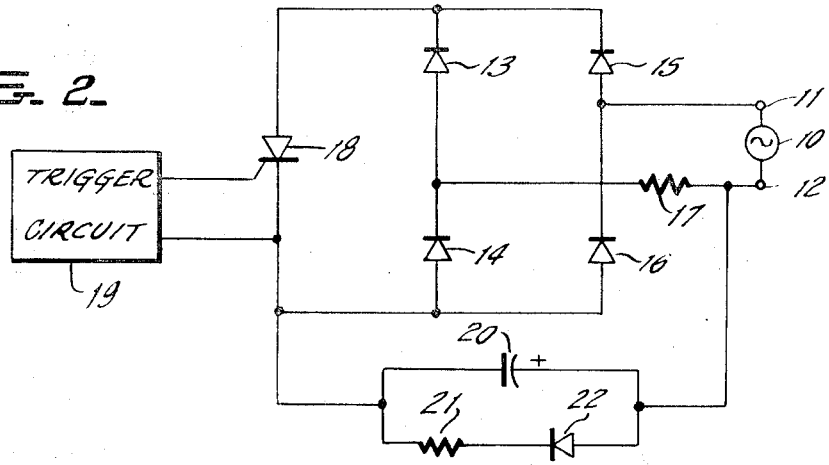
FIG. 2 shows the improvement of the invention as applied to the control circuit of FIG. 1.

In accordance with the present invention, a novel commutating capacitor is added to the circuit of FIG. 1, as shown in FIG. 2, to increase the available turnoff time for the thyristor. In FIG. 2, all components identical to those of FIG. 1 have been given identical numerals. The commutating capacitor 20 of the invention is connected between the cathode of thyristor 18 and AC terminal 12, which is the source terminal end of load 17. In parallel with capacitor 20 are series connected discharge resistor 21 and diode 22. The circuit of FIG. 2 has worked satisfactorily with a 60-cycle AC voltage source of 265 v. RMS. Capacitor 20 was 1 microfarad, 1,000 v. DC resistor 21 was 6 kilohms, 10 watts, load 17 was a resistive load of 25 ohms. Thyristor 18 was International Rectifier type 10RC60A, having a turnoff time less than 50 microseconds. Diodes 13 to 16 were International Rectifier type 6F60A, and diode 22 was International Rectifier type 10D6.

Figure 3:
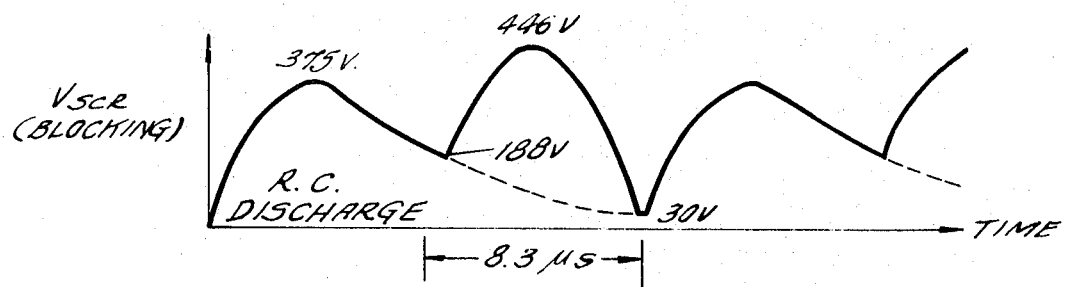
FIG. 3 shows the voltage across the thyristor of FIG. 2 as a function of time with the thyristor blocking.
Figure 4:
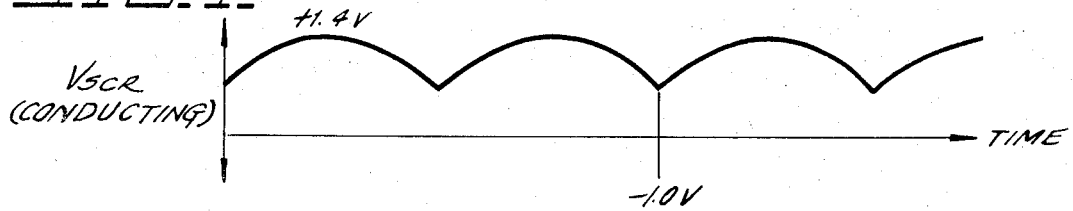
FIG. 4 shows the voltage across the thyristor of FIG. 2 with the thyristor conducting.
Figure 5:
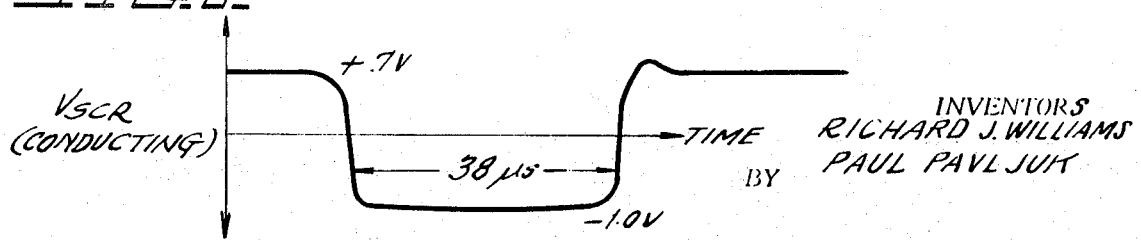
FIG. 5 shows a time-expanded view of the interval in FIG. 4 when the thyristor can turn off.

The operation of the circuit of FIG. 2 can be seen in connection with FIGS. 3, 4 and 5. Referring to FIGS. 2 and 3, when thyristor 18 is not conducting, capacitor 20 is unidirectionally charged from terminal 12 and the AC side of load 17, through diode 16 and back to AC terminal 11. During this half cycle, the blocking voltage on the thyristor 18 raises to the peak of the source voltage (375 volts), and thereafter decreases as determined by the discharge characteristics of capacitor 20 discharging through diode 22 and resistor 21. Note that resistor 21 is chosen to discharge capacitor 20 sufficiently rapidly so that the capacitor voltage is low before the peak of the next half wave when the capacitor voltage and source voltage are additive and in series with thyristor 18. With the values selected for the illustrative embodiment, the capacitor voltage will have decreased to about 30 volts at the end of the next half cycle, and the peak voltage in the second or alternate half cycle is held to about 446 volts.

FIGS. 4 and 5 show the circuit operation when thyristor 18 becomes conductive, due to a firing voltage on the gate from trigger circuit 19.

With thyristor 18 conducting, capacitor 20 can be charged when terminal 11 is positive relative to terminal 12. Thus, on alternate half cycles, and as shown in FIG. 4, as the source voltage approaches zero, capacitor 20 discharges through the load 17. When the capacitor discharge current exceeds the current supplied by the AC source 10, thyristor 18 is reverse biased and the turnoff period begins. This turnoff period is shown in enlarged view in FIG. 5, and, in the circuit of FIG. 2 can be shown to be about 38 microseconds. By making capacitor 20 larger relative to the load 17, any desired value of turnoff time can be obtained.

With this increased turnoff time, it will be clear that the circuit can be deenergized by removing firing voltage from the gate of thyristor 18 whereby the circuit turns off at the half cycle in which the thyristor is back biased.

It is important to note that, unlike most circuits, the turnoff operation is improved with an inductive load. It should also be noted that capacitor 20 could also have been connected to the anode side of the thyristor 18. This is less advantageous than the connection of FIG. 2, however, since the capacitor 20 will charge to a DC level equal to the peak of the line voltage. This too could be avoided by reversing diode 22. However, diode 22, connected as shown in FIG. 2, reduces the power rating of resistor 21 in half during conduction of thyristor 18.

Although this invention has been described with respect to particular embodiments, it should be understood that many variations and modifications will now be obvious to those skilled in the art, and, therefore, the scope of this invention is limited not by the specific disclosure herein, but only by the appended claims.

We claim:
1. An output voltage control circuit comprising in combination:
   a. an AC source having at least first and second terminals.
   b. a load impedance;
   c. a full-wave bridge connected rectifier circuit having first and second AC terminals and first and second DC terminals; said first AC terminal of said bridge connected to said first terminal of said AC source; said load impedance connected between said second AC terminal of said bridge and said second terminal of said AC source;
   d. a thyristor having a gate terminal, an anode terminal and a cathode terminal; said anode and cathode terminals connected to said first and second DC terminals of said bridge respectively;
   e. a firing circuit connected to said gate terminal for firing said thyristor;
   f. AND A CAPACITOR FOR INCREASING THE AVAILABLE TURNOFF TIME FOR SAID thyristor said capacitor connected between said second terminal of said AC source and one of said anode or cathode terminals of said thyristor.

2. The output voltage control circuit of claim 1 which further includes a discharge resistor; said discharge resistor connected in parallel with said capacitor.

3. The output voltage control circuit of claim 1 wherein one terminal of said capacitor is connected to said cathode terminal of said thyristor.

4. The output voltage control circuit of claim 2 which includes a diode; said diode being connected in series with said discharge resistor and in parallel with said capacitor.

5. The output voltage control circuit of claim 5 which further includes a discharge resistor; said discharge resistor connected in parallel with said capacitor.

6. The output voltage control circuit of claim 5 which includes a diode; said diode being connected in series with said discharge resistor and in parallel with said capacitor.

7. The output voltage control circuit of claim 6 wherein said diode has its anode terminal connected to said second terminal of said AC source.

* * * * *